United States Patent

[11] 3,629,990

| [72] | Inventors | Rodney K. Calvert<br>Dunwoody;<br>Arthur B. Viescas, Decatur; Alton J. Fishback, Austell, all of Ga. |
|---|---|---|
| [21] | Appl. No. | 31,688 |
| [22] | Filed | Apr. 24, 1970 |
| [45] | Patented | Dec. 28, 1971 |
| [73] | Assignee | The Mead Corporation |

[54] MECHANISM FOR FORMING SHRINK FILM PACKAGES
3 Claims, 8 Drawing Figs.

[52] U.S. Cl. .................................................. 53/184
[51] Int. Cl. .................................................. B65b 9/04, B65b 47/10
[50] Field of Search ............................. 53/28, 30, 180, 182, 184, 194, 195

[56] References Cited
UNITED STATES PATENTS

| 3,129,545 | 4/1964 | Sloan et al. | 53/184 X |
| 3,501,892 | 3/1970 | Pikal | 53/195 X |
| 3,443,356 | 5/1969 | Hani | 53/184 |
| 2,549,123 | 4/1951 | Osterhof | 53/182 X |

*Primary Examiner*—Theron E. Condon
*Assistant Examiner*—Neil Abrams
*Attorney*—Walter M. Rodgers ABSTRACT: Two series of endless chains each comprising a plurality of traylike open half shells pivotally interconnected at their ends are arranged in close proximity to each other so that the working reaches of the chains are parallel and so that the open shells of one chain are disposed in opposed relation to the open shells of the other chain to form a series of cavities along the working reaches of the chains. A strip of heat-sealable shrink film is disposed along and held against the open faces of the half-shells of each of the chains and vacuum means is employed to draw the film into lining relation with each of the half-shells. An assembly of items to be packaged in inserted into the space between two opposed half-shells adjacent the entry end of the working reaches of both chains. After the half-shells of one reach come into biased engagement with the open half-shells of the other reach to envelope an assembly of items to be packaged, a jet of heated air is applied along the top and bottom edges of the shells to form top and bottom seals between the strips thereby to form a series of interconnected packages. After the packages are formed by heat sealing, the mating shells are moved in opposite directions away from each other and heated air is subsequently applied to each package so as to shrink the film somewhat thereby to preserve the integrity of the package. Preferably the film is of the nonoriented-type and is preheated before being drawn into the half-shells.

After a plurality of packages are formed in interconnected following relationship by the mechanism and method of this invention, the packages are severed one from another by any suitable means. One arrangement for severing interconnected packages is disclosed and claimed in U.S. Pat. application Ser. No. 17,459 filed Mar. 9, 1970. While the package itself may take several specific forms, a typical package is disclosed and claimed in U.S. Pat. application Ser. No. 49,270 filed Nov. 3, 1970 wherein a package having open ends is disclosed.

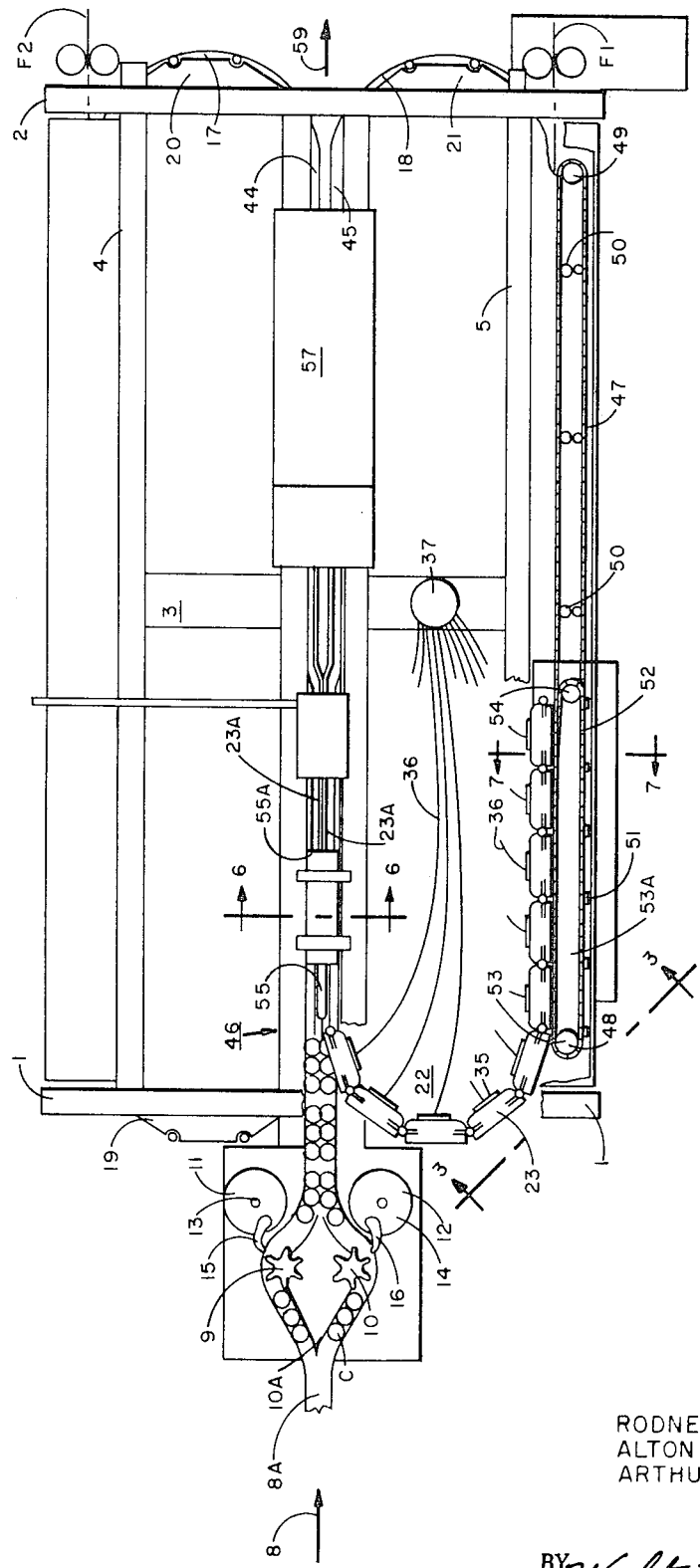

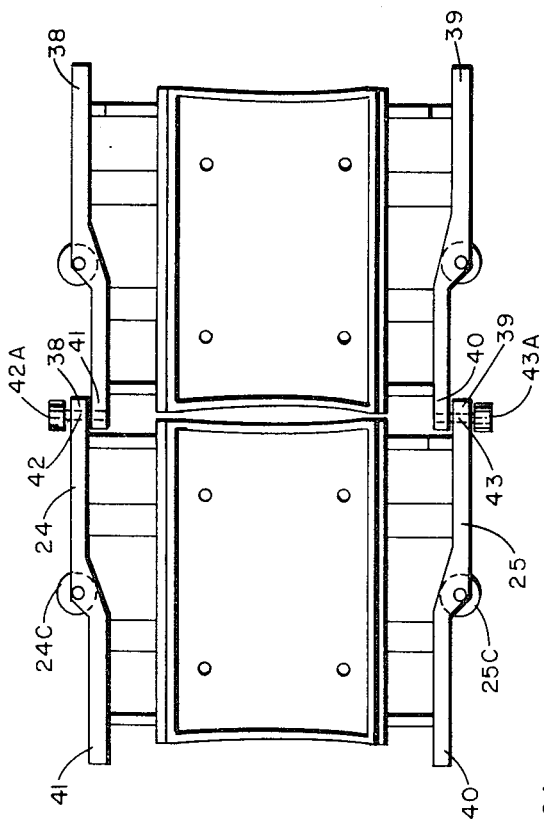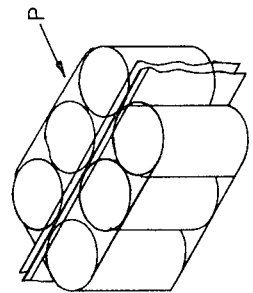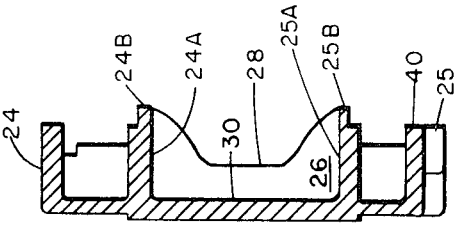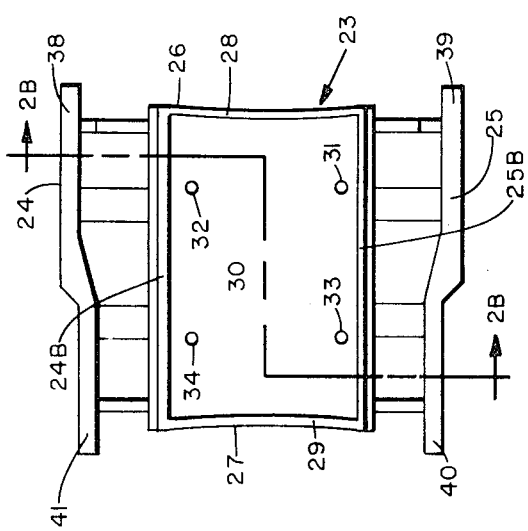

INVENTORS
RODNEY K. CALVERT
ALTON J. FISHBACK
ARTHUR B. VIESCAS

BY *Walter M. Rodgers*

ATTORNEY

MECHANISM FOR FORMING SHRINK FILM PACKAGES

According to this invention, a pair of strips of heat-sealable shrink film are disposed along opposite sides respectively of a plurality of assemblies of items to be packaged and the upper and lower edges of the two strips are effectively secured together by an application of heat and pressure and thereafter an application of heat is made to each package so as to shrink the film thereby to preserve the integrity of the individual packages. Preferably the strips are drawn into a series of half-shells and thus forced to conform generally with the two side-half portions of each assembly of primary packages, the half-shells with the film lined therein being brought into abutting relationship with each other to envelope a package assembly.

For a better understanding of the invention, reference may be had to the following detailed description taken in conjunction with the accompanying drawings in which:

FIG. 1 is a plan view of a machine constructed according to the invention and with certain parts broken away for clarity;

FIG. 2A is a plan view of an open half-shell utilized in the practice of the invention;

FIG. 2B is a sectional view of a half-shell taken along the line designated 2B—2B in FIG. 2A;

FIG. 3 is a view of a pair of open shells taken generally along the line 3—3 in FIG. 1 and showing the shells pivotally interconnected at their ends;

FIG. 4 is a perspective view of a package as it leaves the shells;

FIG. 6 is a cross-sectional view taken along the line designated 6—6 in FIG. 1; and in which

Figure 5:
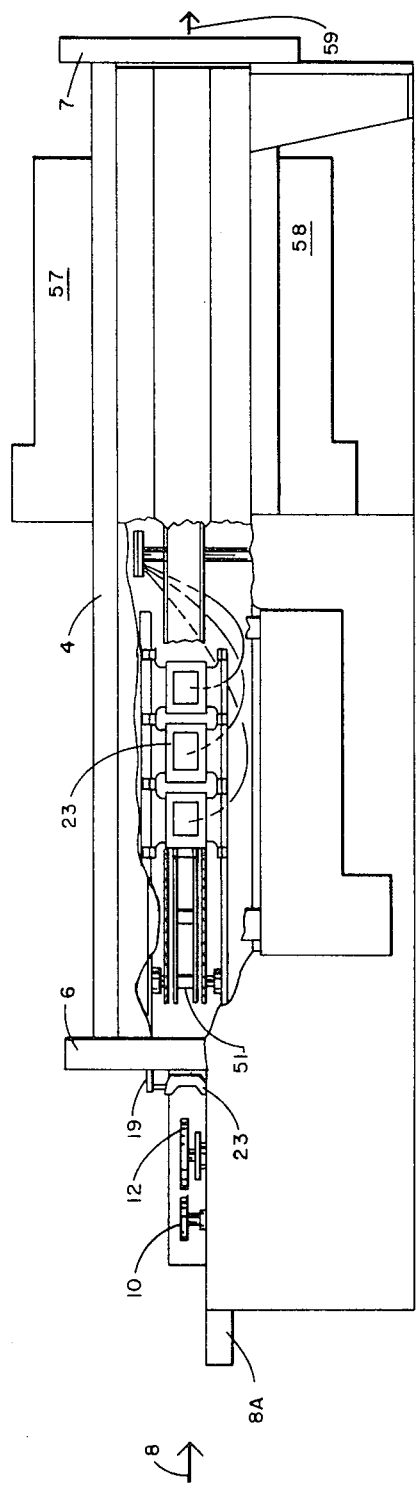
FIG. 5 is a side view of the mechanism shown in FIG. 1.

The frame of the machine as partially shown in the drawings comprises a pair of horizontal supporting elements designated by the numerals 1 and 2 as well as horizontal support beam 3. These elements are supported by vertical posts and are interconnected by longitudinally disposed struts 4 and 5 mounted at their ends on a pair of vertical pedestals 6 and 7, the vertical supports for longitudinal beam 5 being omitted from the drawings for clarity and simplicity.

Items to be packaged such as the primary packages or cans C are fed into the left-hand end of the machine toward the right as indicated by the arrow 8 on a high-speed conveyor 8a. These cans C are metered by a pair of star wheels 9 and 10 which are mounted on vertical shafts and rotatable at a speed which is synchronous with the speed of subsequent packaging operations. These star wheels 9 and 10 together with the wedge-shaped structure 10a cooperate to divide the incoming cans C into two rows and the rows are arranged to move at a predetermined speed.

For the purpose of dividing the cans C in the two rows into an assembly of cans and also in order to impart a predetermined measure of acceleration to the movement of each assembly of cans, accelerating elements 11 and 12 are rotatably mounted on vertical shafts 13 and 14 driven at predetermined speeds and a pair of fingers 15 and 16 are pivotally mounted on elements 11 and 12 respectively and are arranged to perform the desired separating and accelerating functions. While these elements could assume different forms, one arrangement which is particularly well suited for use in conjunction with this invention is disclosed and claimed in U.S. application Ser. No. 762,775 filed Sept. 26, 1968 now U.S. Pat. No. 3,521,737.

After the cans C are arranged in assemblies adjacent the accelerating wheels 11 and 12 and apparatus associated therewith, the assemblies are formed into a series of packages by means of a pair of chains each chain comprising a plurality of half-shells 23 and designated generally in the drawings by the numerals 17 and 18.

Both these chains are endless and chain 17 is rotatably mounted on rotatable elements 19 and 20 while endless chain 18 is rotatably mounted on rotatable element 21 and another element not shown in FIG. 1 for the sake of clarity but located in the region of the numeral 22. Since both of the endless chains 17 and 18 are identical in construction, only one such chain, i.e., 18 is here described in detail. The filmstrips F1 and F2 are heated by any known suitable heater means to a temperature somewhat above ambient temperature to facilitate manipulation thereof.

As is apparent in the drawings, chain 18 comprises a series of open half-shells designated by the numeral 23. These half-shells ride on rollers 24C and 25C and are pivotally interconnected at their ends and each comprises a pair of outer sidewalls 24 and 25, a pair of inner sidewalls 24A and 25A and a pair of end walls 26 and 27, as is best shown in FIGS. 2A and 2B. End walls 26 and 27 are recessed inwardly as indicated at 28 and 29. Since the package preferably is open-ended to provide for aeration of the interior and the elimination of undesired moisture, it is desirable not to seal the ends. The recessed edges 28 and 29 insure that the package ends are not sealed. Bottom wall 30 is provided with a series of apertures 31–34 which are interconnected with a manifold best shown at 35 in FIG. 1. Vacuum pressure is supplied to each of the half-shells 23 through its associated manifold 35 and via a series of pneumatic flexible tubes 36 interconnected with a rotatable vacuum header element 37 which in turn is interconnected by means not shown with a source of vacuum pressure also not shown.

The half-shells 23 are provided at their ends with projecting lugs 38 and 39 at one end and with inwardly spaced lugs 40 and 41 at the other end. Suitable pins such as are indicated at 42 and 43 serve to interconnect the lugs at adjacent ends of the adjacent half-shells 23 as best shown in FIG. 3. Thus a pair of continuous chains such as 17 and 18 are provided according to the invention. As is apparent in FIG. 1, an assembly of items such as cans C is disposed adjacent the entry ends of the working reaches 44 and 45 of the endless chains 17 and 18 as designated generally by the arrow 46.

An endless film feed tract 47 including upper lug chain 47A and lower chain 47B and backup plates 48A and 48B is rotatable about double sprockets 48 and 49 and is supported by a series of bolts 50 and holds the filmstrip F1 adjacent the open faces and in contact with the edges 24B and 25B of sidewalls 24A and 25A of shells 23 forming endless chain 18. Since the ends 27 and 28 of the shells are recessed as indicated at 28 and 29, a series of lugs 51 mounted on endless belt 52 are disposed to engage film F1 and to push it into snug engagement with the recesses 28 and 29 thereby to facilitate the vacuum formation of film lining for the shells. Belt or chain 52 is mounted on sprockets 53 and 54 and backup plate 53A supports the working reach at chain 52 against lateral movement toward the left as viewed in FIG. 7.

As is obvious in FIG. 1, clockwise rotation of endless chain 18 and counterclockwise rotation of endless chain 17 causes the half-shells 23 at the location 46 to form a cavity. Since the filmstrip F1 has been drawn into lining relationship within the half-shells 23 comprising the endless chain 18 and since the filmstrip F2 has been drawn into the half-shells 23 comprising the endless chain 17, it is apparent that each assembly of cans is enveloped by two side-by-side mating film half-sections of film. Furthermore, it is apparent that these half-sections are interconnected with each other in end to end relationship.

As is apparent particularly in FIG. 6, a jet of superheated air or other gaseous fluid is directed by nozzles 55 and 56 from heaters 55A and 56A respectively along the contacting edge portions of each of the films F1 and F2 both above and below each assembly of cans C, pressure being applied by the opposed edges 24B and 25B of walls 24A and 25A. This superheated air and the pressure of the edges 24B and 25B of walls 24A and 25A causes the edges of the films F1 and F2 to become securely bonded together.

Figure 6:
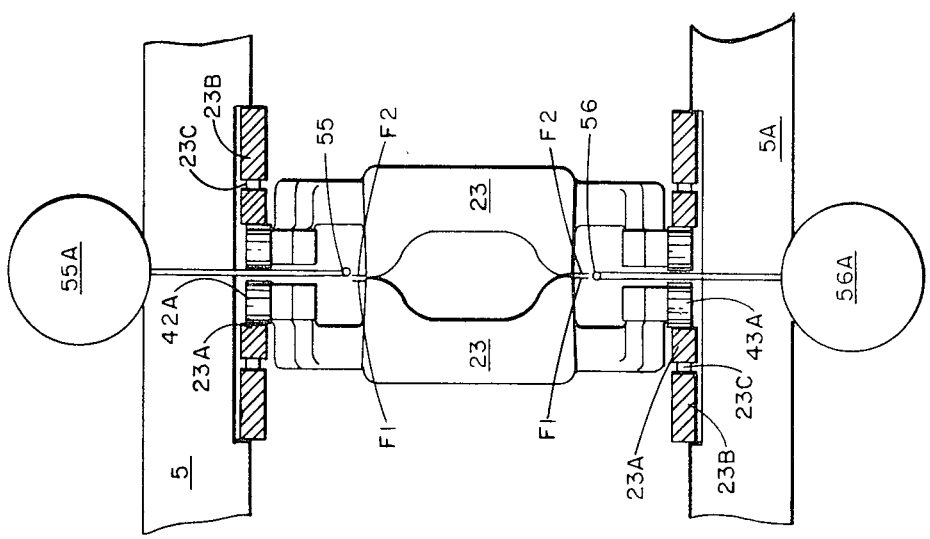

As shown in FIGS. 1 and 6, the working reaches of chains 17 and 18 engage tracks or rails 23A. For the purpose of biasing the shells 23 of one chain toward the corresponding shells of the other chain, movable tracks or rails 23A are transversely movable and biased inwardly by compression springs 23C which are purchased at their outer ends on fixed supports 23B. The rails 23A engage the rollers 42A and 43A on the half-shells 23. By this means a firm, even pressure is applied to insure a secure bond between films F1 and F2.

After the bonding operation, each package is carried forwardly from left to right through the machine until it enters the region of the shrink ovens such as 57 and 58 disposed immediately above and below the endless chains 17 and 18 and their associated interconnected packages P.

In order to shrink the film sufficiently to preserve the integrity of the individual packages and also to provide a structure which is sufficiently sturdy to withstand the subsequent severing operation, an application of heat may be applied to the packages P by the ovens 57 and 58 as is best shown in FIG. 5. After the shrink operation is completed the packages are discharged to the right in the direction indicated by the arrow 59 onto a suitable timed conveyor which in turn cooperates with suitable mechanism for severing adjacent packages from each other, such, for example, as the arrangement disclosed and claimed in the aforementioned application, Ser. No. 17,459 filed Mar. 9, 1970.

While ovens such as 57 and 58 may be disposed upstream from the cutting elements whereby one package is severed from another as shown for example in FIGS. 1 and 2, such an arrangement is not necessary for many applications of the invention. Stated otherwise the heating operation represented by ovens 57 and 58 may be deferred until after the package-severing operation at which an application of heat may be applied in conventional fashion to perform the desired shrinking operation. If the shrinking operation is utilized prior to severing, it may be desirable to provide certain cam structure for driving the half-shells somewhat apart so as to allow an application of heat to be made inside the shells and around the girth of the packages such as could be effected within or adjacent to the ovens 57 and 58. In other applications, ovens 57 and 58 may be used for localized or preshrinking only while the final shrinking may be performed subsequently.

As explained above, the film sheets such as F1 and F2 are drawn down into the half-shells associated therewith. This operation, as explained, is a vacuum process and in order to be effective, the film must engage the edges of the half-shell such as edges 24B and 25B the sidewalls 24A and 25A and the curved ends 28 and 29 before and during the application of vacuum pressure through the apertures 31-34 inclusive. As explained, the film is held against the arcuate portions 28 and 29 of the end walls 26 and 27 by means of the elements 51.

Figure 7:
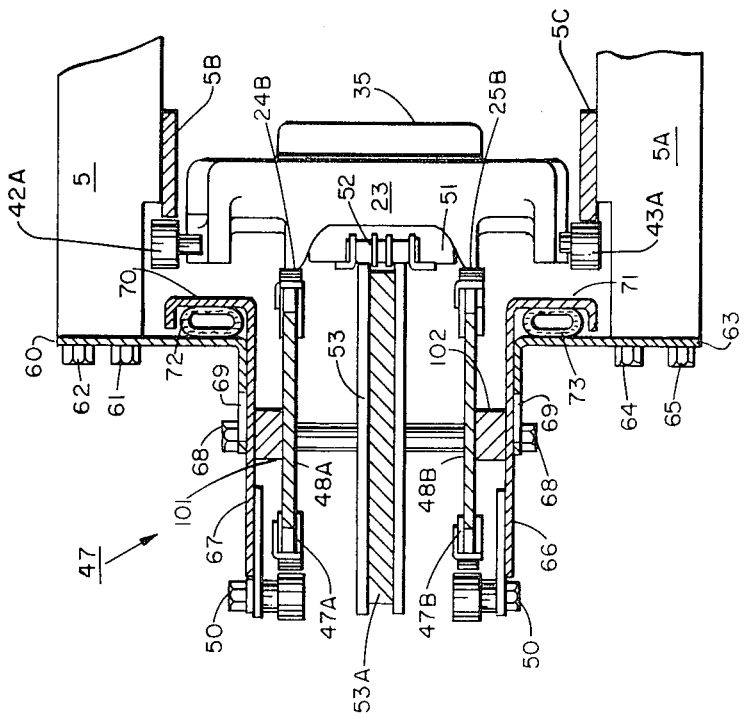
FIG. 7 is a cross-sectional view of the film preheating assembly taken along the line designated 7—7 in FIG. 1.

In order to insure a firm and secure yet gentle contact of the film with the edges 24B and 25B of the sidewalls 24A and 25A, structure such as is best shown in FIG. 7 may be employed. A structural support strip 60 of L-shaped cross-sectional configuration is secured by bolts 61 and 62 to the frame member 5. Similarly a supporting strip of L-shaped cross-sectional configuration designated by the numeral 63 is affixed by bolts 64 and 65 to supporting element 5A to form a lower supporting element.

The structure 47 including a lower supporting plate 66 and an upper supporting plate 67 is slidably connected with the supporting strips 63 and 60 respectively by a series of lost motion connections in the form of a plurality of bolts 68 securely affixed in bolt apertures formed in plates 66 and 67 and an elongated slot 69 formed in L-shaped plate 60 and a similar elongated slot 69 formed in L-shaped support member 63. Thus the structure 47 is securely but yieldably mounted for lateral movement from left to right and vice versa as viewed, for example, in FIG. 7.

In order to urge the structure 47 toward the right as viewed in FIG. 7 and thereby to impart a gentle sealing force whereby the edges 24B and 25B of the walls of the half-shells engage the film sheets F1 and F2, the top plate 67 is provided with a vertically disposed upwardly extending projecting strip 70 and plate 66 is provided with a vertically disposed downwardly extending projecting strip 71. Interposed between strip 70 and supporting member 60 is a flexible hollow fluid conduit designated by the numeral 72 while a similar conduit 73 is interposed between strips 63 and number 71. An application of pressure fluid to the interior of conduits 72 and 73 tends to cause those conduits to expand and thereby to impart sidewise lateral movement toward the right to the structure 47. Spaces 101 and 102 serve to interrelate the parts for proper operation.

The embodiments of the invention in which an exclusive property or privilege is claimed are described as follows:

1. Mechanism for forming a series of packages from a pair of continuous strips of film, said mechanism comprising a pair of endless chains formed of pivotally interconnected open shells arranged with their working reaches in parallel close proximity to each other and so that the open sides of the shells of each chain face the open sides of corresponding shells of the other chain to form a series of cavities along the working reaches of said chains, the end edges of said shells being recessed inwardly, means for imparting synchronous movement to said chains, means for causing portions of each of said strips to line the interior of the shells of one of said chains with edge portions of said strips protruding outwardly beyond the edges of said shells and in contact with each other, a series of spaced lugs movable in synchronism with each of said chains and disposed to cause the filmstrips to engage the recessed parts of the ends of said shells of the associated chain of shells respectively thereby to facilitate the lining of said shells by vacuum pressure applied inside said shells, means for inserting articles to be packaged into said shells adjacent the entry ends of said working reaches, and stationary means for effecting a bond between the outwardly protruding edges of said strips thereby to form a continuous series of interconnected packages.

2. Mechanism according to claim 1 wherein interconnected lugs are movable in synchronism with each of said chains and disposed to urge the film into engagement with the end edges of said shells thereby to facilitate the lining of said shells by vacuum pressure applied inside said shells.

3. Mechanism according to claim 1 wherein rollers are mounted on said shells and wherein said rollers ride on tracks biased toward each other.

* * * * *